United States Patent
Hamilton et al.

(10) Patent No.: US 10,740,497 B2
(45) Date of Patent: *Aug. 11, 2020

(54) SYSTEM AND METHOD FOR CRYPTOGRAPHIC PROCESSING IN A TIME WINDOW

(71) Applicant: Synopsys, Inc., Mountain View, CA (US)

(72) Inventors: Neil Hamilton, Kanata (CA); Francois Bourdon, Nepean (CA); Michael Borza, Ottawa (CA)

(73) Assignee: Synopsys, Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/996,382

(22) Filed: Jun. 1, 2018

(65) Prior Publication Data

US 2018/0278411 A1 Sep. 27, 2018

Related U.S. Application Data

(63) Continuation of application No. 14/056,289, filed on Oct. 17, 2013, now abandoned.

(60) Provisional application No. 61/715,066, filed on Oct. 17, 2012.

(51) Int. Cl.
*G06F 21/75* (2013.01)
*H04L 9/00* (2006.01)
*G06F 21/72* (2013.01)

(52) U.S. Cl.
CPC ............ *G06F 21/755* (2017.08); *G06F 21/72* (2013.01); *H04L 9/003* (2013.01); *G06F 2221/2123* (2013.01)

(58) Field of Classification Search
CPC ... H04L 9/003; H04L 2209/08; G06F 21/602; G06F 21/72; G06F 21/755; G06F 2207/7223; G06F 21/75
See application file for complete search history.

(56) References Cited

U.S. PATENT DOCUMENTS

| | | | | |
|---|---|---|---|---|
| 7,685,436 | B2* | 3/2010 | Davis | G06F 21/72 713/153 |
| 7,848,515 | B2* | 12/2010 | Dupaquis | H04L 9/0625 380/28 |
| 9,577,822 | B1* | 2/2017 | Pedersen | G09C 1/00 |
| 2003/0223580 | A1* | 12/2003 | Snell | H04L 9/003 380/28 |
| 2007/0263859 | A1* | 11/2007 | Teglia | H04L 9/003 380/29 |
| 2008/0019503 | A1* | 1/2008 | Dupaquis | H04L 9/003 380/28 |
| 2008/0219437 | A1* | 9/2008 | Ebeid | G06F 7/725 380/30 |

(Continued)

*Primary Examiner* — Tae K Kim
(74) *Attorney, Agent, or Firm* — Jaquez Land Greenhaus LLP; Bruce W. Greenhaus, Esq.

(57) ABSTRACT

A method is disclosed for providing first data and a first secret key to a cipher processor for ciphering. The first data is ciphered in accordance with a first cipher process and the first secret key to provide output data. Before ciphering of the first data, extra data is inserted within the cipher processor for ciphering in accordance with at least a portion of said first cipher process. The extra data is inserted within a sequence of cipher processor operations for obfuscating the output data.

10 Claims, 5 Drawing Sheets

(56) References Cited

U.S. PATENT DOCUMENTS

| | | | |
|---|---|---|---|
| 2009/0010424 A1* | 1/2009 | Qi | G06F 7/723 |
| | | | 380/28 |
| 2009/0183009 A1* | 7/2009 | Delfs | G06F 21/74 |
| | | | 713/193 |
| 2010/0095133 A1* | 4/2010 | Peter | G06F 7/00 |
| | | | 713/189 |
| 2010/0318811 A1* | 12/2010 | Motoyama | G06F 7/00 |
| | | | 713/190 |
| 2011/0110519 A1* | 5/2011 | Suzaki | H04L 9/0625 |
| | | | 380/255 |
| 2011/0255689 A1* | 10/2011 | Bolotov | H04L 9/0631 |
| | | | 380/42 |
| 2012/0087489 A1* | 4/2012 | Sekiya | H04L 9/003 |
| | | | 380/28 |
| 2012/0159194 A1* | 6/2012 | Anderson | H04L 9/002 |
| | | | 713/190 |
| 2013/0064362 A1* | 3/2013 | Tang | H04L 9/002 |
| | | | 380/29 |

* cited by examiner

SYSTEM AND METHOD FOR CRYPTOGRAPHIC PROCESSING IN A TIME WINDOW

CROSS-REFERENCE TO RELATED APPLICATIONS

This application claims the benefit under 35 USC § 119(e) of U.S. provisional application No. 61/715,066 filed on Oct. 17, 2012 and application Ser. No. 14/056,355 filed on Oct. 17, 2013, the entire contents of which are incorporated herein by reference.

FIELD OF THE INVENTION

The invention relates to securing cryptographic systems, particularly block cipher systems, against attacks that seek to obtain secret information about cryptographic keys through analysis of power or energy consumption and related electromagnetic emanations.

BACKGROUND

Modern cryptographic systems seek to protect the secrecy of information through the application of a mathematical transformation that permutes the information to be protected with a secret, called a key, to produce a cipher text. The cipher text may be subsequently processed using a related key to reverse the transformation and recover the original information at a later time. Symmetric cryptography uses the same secret key to both encrypt and decrypt the information. According to Kerckhoffs's principle, the security of a well-designed cryptographic system rests entirely in the key. An adversary can know all the design and implementation details of the cryptographic system except the secret key, and will be unable to recover the information significantly faster than trying, on average, half of all possible values of the key.

Under some circumstances, an adversary with physical access to or in close physical proximity to the cryptographic system may be able to determine information about the data and especially the keys that is leaked through side-channels such as power consumption measurements or electromagnetic emanations. In such cases, it would be advantageous to provide a method of obfuscating cipher processing of data.

SUMMARY

In accordance with embodiments of the invention there is provided a method comprising providing first data and a first secret key to a cipher processor for ciphering; said cipher processor ciphering the first data in accordance with a first cipher process and the first secret key to provide output data; and before ciphering of the first data, inserting extra data within the cipher processor for ciphering in accordance with at least a portion of said first cipher process, said extra data inserted within a sequence of cipher processor operations for obfuscating said output data.

In accordance with embodiments of the invention there is provided a method comprising providing a first stream of data and an associated first secret key; expanding the associated first secret key to form an associated first expanded secret key; ciphering a plurality of guard rounds before processing the first data stream; ciphering the first data stream in accordance with the associated first expanded secret key; ciphering a plurality of guard rounds after processing the first data stream; and providing the ciphered first stream of data at an output port.

In accordance with another embodiment of the invention, there is provided a cipher processor comprising a key store for storing a first secret key; a first data store for storing at least a portion of first data for ciphering thereof; and a cipher processor for processing the first data in accordance with a first cipher process and the first secret key to provide output data therefrom, and during processing of the first data inserting within the cipher processor at least a portion of the first data comprising at least a guard round for being processed thereby in accordance with a portion of a same cipher process, the at least a guard round inserted within a sequence of cipher processor operations for obfuscating operation thereof.

BRIEF DESCRIPTION OF THE DRAWINGS

Exemplary embodiments will now be described in conjunction with the following drawings, wherein like numerals refer to elements having similar function, in which.

DETAILED DESCRIPTION

Figure 1:
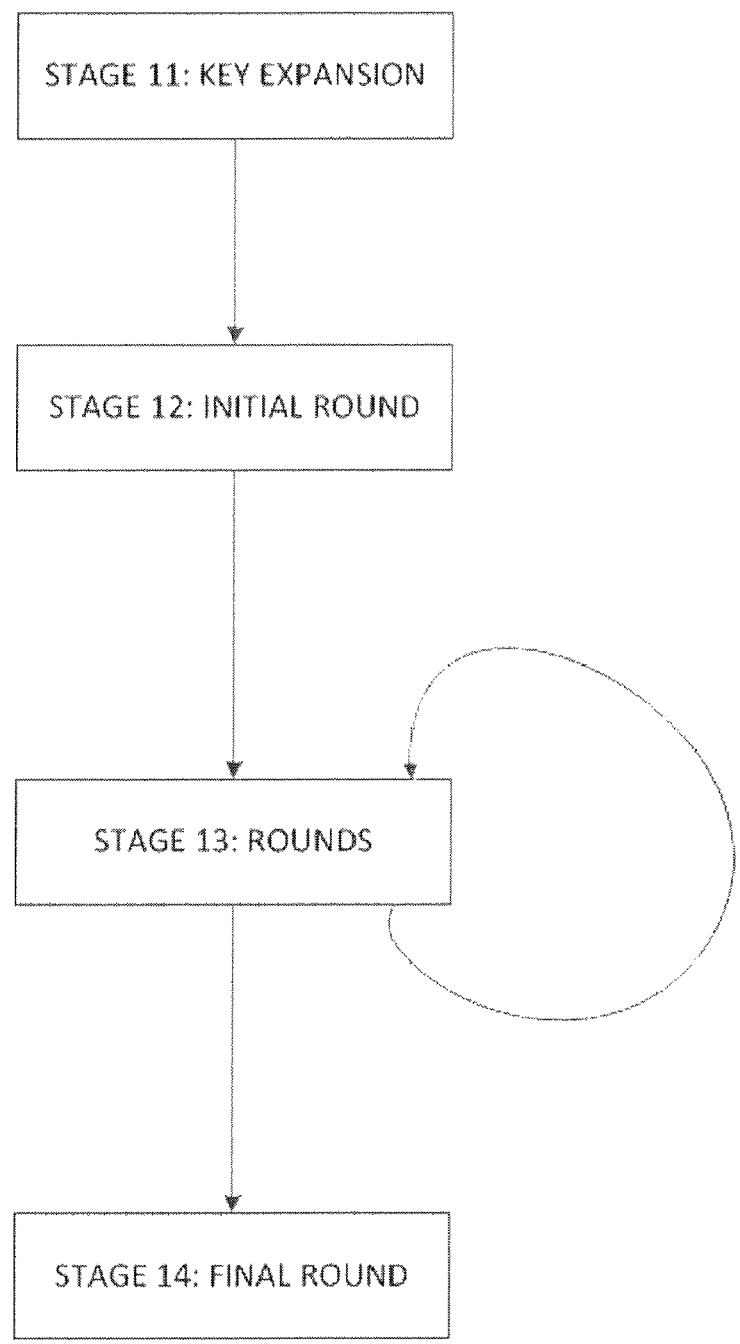
FIG. 1 shows a simplified block diagram of a typical symmetric block cipher that is logically structured as a sequence of rounds.

The following description is presented to enable a person skilled in the art to make and use the invention, and is provided in the context of a particular embodiment, application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Definitions

Encryption: A mathematical process for use in obfuscating data. Encryption is a way to use a cipher. Typical ciphers aim for data to be extractable from the cipher only by those in possession of secret information.

Decryption: A mathematical process for use in extracting data obfuscated by encryption. Decryption is a way to use a cipher. Typical ciphers aim for data to be extractable from the cipher only by those in possession of secret information.

Cipher: A mathematical process or transformation for use in obfuscating data and in extracting data so obfuscated. Typical ciphers aim for data to be extractable from the cipher only by those in possession of secret information.

Cipher code: A mathematical process for use with a cipher key for obfuscating data in a known way such that useful information results for those having access to an associated cipher key. In symmetric cipher codes, the cipher key and the associated cipher key are the same secret key. In asymmetric cipher codes, the cipher key is one of a private key kept secret and the associated public key—a key pair. The associated cipher key is the other key in the key pair.

Cipher key: Information used with a cipher for encrypting and/or decrypting data. The same cipher used to encrypt a message with one cipher key produces different results than the same cipher using a different cipher key. Cipher keys are typically symmetric, the same for both encrypting and decrypting operations, or asymmetric, different for the encrypting and decrypting operations.

Secret key: A cipher key that is meant to remain secret. Shared cipher keys, used in symmetric encryption processes, and private asymmetric keys are examples of secret keys.

Encryption key: A key used within a cipher for encrypting data for decryption using the cipher. Encryption keys are typically symmetric, the same as the decryption key, or asymmetric, different from the decryption key.

Decryption key: A key used within a cipher for decrypting data encrypted using the cipher. Decryption keys are typically symmetric, the same as the encryption key, or asymmetric, different from the encryption key.

DES: Data Encryption Standard. Defined in NIST FIPS 46-3, DES is a symmetric block cipher based on a Feistel network that was adopted for use and widely deployed in the United States and internationally. While the standard is now withdrawn due to its loss of security relative to the ready availability of massive computing power to attack data protected by it, DES is still widely deployed and used today. A method of triple encryption using DES called Triple DES (TDES or 3DES) is still considered secure and is also widely deployed.

AES: Advanced Encryption Standard. Defined in NIST FIPS 197, AES is a modern block cipher based on the Rijndael cipher developed by Joan Daemen and Vincent Rijmen. AES is specified in three security strengths based on 128, 192 and 256 bits keys. All variants of AES are considered secure against brute force attacks for the foreseeable future.

Side-Channel Attack: A side channel attack is any attack based on information gained from the physical implementation of a cryptosystem, rather than brute force or theoretical weaknesses in the algorithms. For example, timing information, power consumption and electromagnetic emanations can provide information that is sometimes exploitable to break the system.

SPA: Simple power analysis. SPA is a side-channel attack based on observation of a measure of the instantaneous power consumption response of a device over time. Variations in power consumption occur as the device performs different operations, and may be data dependent. For example, different instructions performed by a microprocessor will have differing power consumption profiles depending on the data of the operations. SPA may allow an adversary to develop an understanding of the operations taking place in a device and the data involved in those operations. In the extreme case an adversary can recover the secret key for encryption or the plain text protected by it, or both.

DPA: Differential power analysis. DPA is a side-channel attack involving statistically analyzing power consumption measurements from a cryptosystem. The attack exploits biases varying power consumption of microprocessors or other hardware while performing operations using secret keys. DPA attacks use signal processing and error correction techniques to attempt to extract secrets from measurements, which normally contain too much noise to be analyzed using simple power analysis. Using DPA, an attacker may obtain secret keys by analyzing power consumption measurements from multiple cryptographic operations performed by a vulnerable device. Higher-Order DPA (HO-DPA) correlates the measurements of multiple sources that may be available to attack the device.

A typical symmetric block cipher is logically structured as a sequence of rounds, similar to that shown in FIG. 1 wherein the cipher is broken into 4 stages 11, 12, 13, and 14. Generally the ciphering processes are executed on a cipher processor having one or more input ports for plain text or cipher data and one or more output ports for cipher or plain text data depending if the cipher processor is performing en-ciphering (encrypting) or de-ciphering (decrypting). A cipher processor may be a dedicated hardware cryptographic processing engine, or may be a general-purpose processor executing instructions that implement cryptographic functions and protocols, or even a combination of the two methods.

In Stage 11, the key expansion stage is often performed cyclically with the rounds, so though it is shown as a stage, it is often just a process executed between or in parallel with the rounds. Block ciphers get their name from the fact that they operate on data in fixed sized words of b bits, called the block size. Typical values for b are 32, 64 or 128. A secret key K is processed by an expansion function f to produce a first round key $K_1$ in Stage 11. The message M is combined with the round key $K_1$ in the round function R within Stage 12 to produce an intermediate cipher text $C_1$. The expansion function f is applied to the first round key $K_1$ to produce a second round key $K_2$. Intermediate cipher text $C_1$ is then combined with the round key $K_2$ in the round function R to produce an intermediate cipher text $C_2$ within Stage 13. This process is repeated for a number of rounds N−1 at Stage 13 and then in a final round (Stage 14) from which is provided a final cipher text C, the encrypted form of the message M. The instantaneous power consumption of the electronic circuits that implement these operations, and particularly data-dependent differences in these operations, are the targets of an adversary mounting a power analysis attack such as DPA.

In practice, message M may be formatted to account for mismatches between the size of M and the block size of the cipher function. When the block size b is larger than the message, a convention may be adopted for padding the plain text with bits of a known or predetermined value (e.g. 0) that may be removed later during the decryption process. When the block size b is smaller than the message M, the message may be decomposed to a sequence of message fragments such that $M=M_\bullet \|M_1\| \ldots \|M_n$, where each fragment $M_i$ is a maximum of b bits in size, and cipher text is produced for each block. Variations on the encryption and decryption process exist that use the cipher function in different modes to achieve different security, performance or structural properties in systems built on them.

Figure 2:
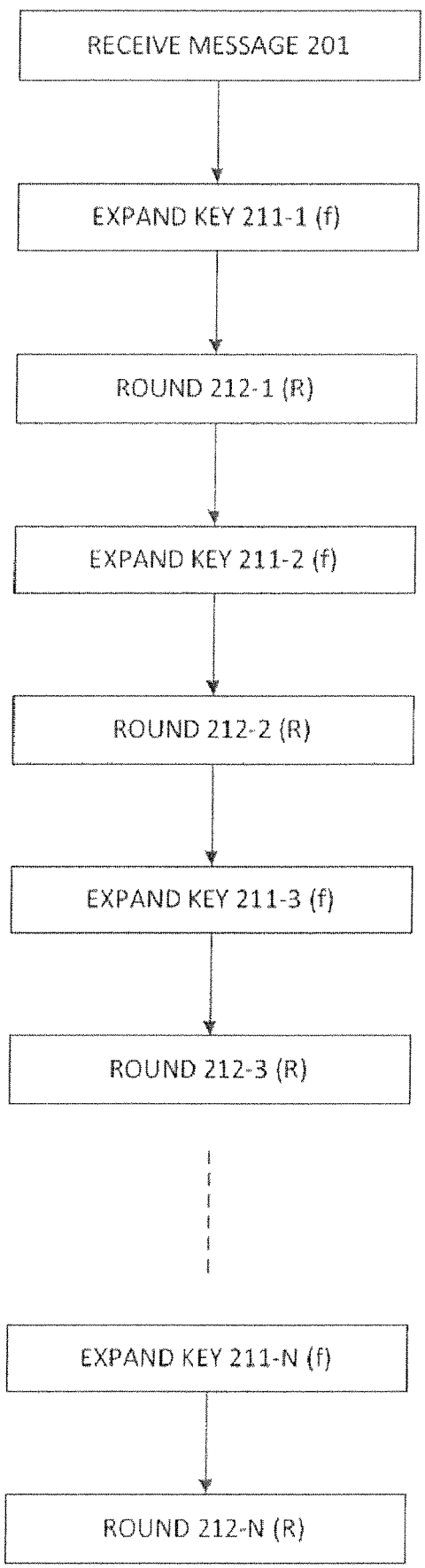
FIG. 2 shows a simplified diagram of a cipher process constructed using a single instance of the round and key expansion functions R and f that are applied iteratively to transform the plain text to cipher text.

In one realization of a cipher function shown in FIG. 2, the cipher is physically constructed using a single instance of the round and key expansion functions R (212-1 to 212-N in FIG. 2) and f (211-1 to 211-N in FIG. 2) that are applied iteratively to transform the plain text to cipher text. This construction allows an adversary to isolate and analyze the processing that occurs in each round separately from that which occurs in other rounds. In some ciphers, notably AES and DES, the round and/or key expansion functions may be further decomposed to smaller units of work that may themselves be processed iteratively. A naive decomposition of this kind may further simplify the process of analyzing the cipher because the smaller amount of data being processed at each point in time is simpler for an adversary to probe and measure. Thus, it is advantageous for a system that is resistant to power analysis attacks to operate on as much data as possible in each operation. This is typically a full b-bits block of data at a time.

Figure 3:
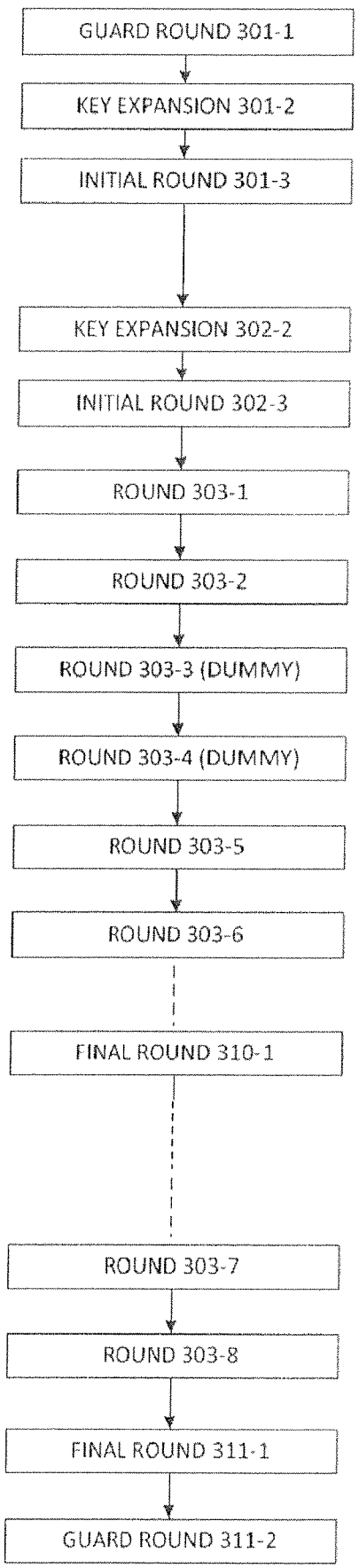
FIG. 3 shows a scheduled interleaving of cipher rounds instead of a simple alternating of data from each stream.

A system for cryptographic processing optionally operates on more than one stream of data simultaneously. Combining the processing of multiple simultaneous streams of data affords the opportunity to obfuscate the power signatures of each individual stream. FIG. 3 shows a realization that achieves this for two simultaneous streams. The principle readily extends to greater numbers of simultaneous streams. The processing of rounds for each stream is interleaved with processing of the other stream(s). As is shown, the key expansion operation (for example 301-2) is performed in the first stage. Alternatively, it is performed for each round with that round. The initial round 301-3 is clearly an initial round, but beyond that apportioning rounds between the streams is quite difficult. When initial rounds are distinguishable, the second initial round 302-3 is also distinguishable. That said, rounds 303-1 to 303-8 and until the final round cannot easily be divided into stream 1 and stream 2. To make it even more difficult, optionally other data in the form of a third stream, for example comprising dummy rounds, are inserted within the stream such as round 303-3 and round 303-4.

As shown in FIG. 3, it is typically not sufficient to simply interleave processing by alternatively selecting data from each stream. Doing so complicates an adversary's analysis problem, but not sufficiently to provide appreciably greater protection against a successful attack. Thus, the system selects rounds arbitrarily from the input streams using a priori information in those streams, a process referred to as dithering. The arbitrary position of rounds in each stream relative to the others makes the temporal stack-up for power analysis correlation a significant challenge.

Each stream in the cryptographic process requires its own set of state variables. Depending on implementation, these may be stored in RAM (random access memory) or register files provided for this purpose. In some implementations, the data paths are designed and implemented to closely match the streams one to another so as to provide little to differentiate processing in one stream or another.

One method to determine the dithering schedule for the available streams is to combine the keys from the streams by GF(2) addition. While having the advantage of simplicity, it has the disadvantage of using the data that is to be protected in a very direct manner. Thus, it is desirable to use other methods to determine the dithering schedule. One such method uses the keys to seed a set of maximal length linear feedback shift registers (LFSR). One LFSR is used for each of the available input streams. The feedback polynomials for the LFSRs are chosen to be different from each other. In one realization each key is used to seed the input directly. If the keys are longer than the internal state of the LFSR, words of the key may be combined, e.g. through GF(2) addition to maximize the key's contribution to the initial state of the LFSR.

The outputs of the LFSRs are combined to form a selector for one of the available input streams in each round. In one realization of the selector, internal states of the LFSRs are combined through GF(2) addition. In another realization, internal states of the LFSRs are combined through a non-linear combining function such as a DES S-box.

A limitation of the previous scheduling system is that the schedule is static for a fixed choice of input keys. In another realization of the scheduling process, the schedule determination may incorporate other a priori data from the system inputs such as the message contents or packet counters supplied as input to the system. This will make the schedule dynamic from block to block or from message to message, thereby significantly increasing the effort required for an adversary to analyze the system.

The forgoing method is equally applicable to many standard block ciphers such as DES and AES. In the special case of triple encryption, and particularly TDES, there is a choice to be made about how to structure the three passes through the cipher. The standard TDES encryption scheme is structured as three DES operations, arranged in an E-D-E (encrypt-decrypt-encrypt) series. (Decryption is achieved using the obvious D-E-D series.) The simplest way to accomplish TDES is to simply sequence three distinct operations. However, by arranging the circuit to perform the E-D-E processing continuously as if it were one single operation, further advantage is gained over an adversary attempting a power analysis attack due to the further uncertainty creating by lengthening the sequence of operations intermixed in the schedule.

In another embodiment, an adversary focuses much of his or her effort on analysis of first and/or last rounds of the encryption process shown in FIG. 3 at 301-3, 302-3, 310-2, and 311-2. Part of the reason is that processing in these rounds is often different from those of other rounds. For example, the AES algorithm uses a different processing path in the last round than in previous rounds. Thus an adversary has possible differences to use in comparison to other rounds in an effort to understand the particular implementation under attack. An important first step to protect against this avenue is to design the processing path to perform the same work in each round, but select the correct intermediate result according to the requirements of the algorithm.

Optionally, further protection is afforded by defining a time window in which processing occurs that is longer than the time required to perform that actual processing of the input streams. Processing the input data streams starts some time after the start of the window. Prior to processing the actual input streams, a set of padding or dummy rounds referred to as guard rounds is processed. The results of those rounds are discarded after transferring them to the output stream. The scheduling system determines how many guard rounds are processed prior to input stream processing. Thereafter, the scheduling algorithm selects among the available input streams to process data until those streams have been exhausted. Subsequent processing in the allocated window are appended guard rounds. A parameter of the system design sets minima on the number of prefix and postfix guard rounds that will be performed. Optionally, guard rounds book end each initial (for example 301-1 and 302-1 in FIG. 3) and final round (for example 310-2 and 311-2 in FIG. 3) such that each initial and final round could be any one of a number of rounds.

The presence of postfix guard rounds is especially important. In their absence, the task for an adversary is significantly simpler than when they are present. Without guard rounds present, it is often the case that there will be significant runs of consecutive rounds at the end of an encryption block drawn from one particular stream. This makes it more likely that an adversary can gain advantage in the analysis of one of the streams. Postfix guard rounds reduce the incidence of these runs significantly and makes the distribution of rounds in the schedule much more uniform than without them.

The presence of guard rounds represents a trade-off between enhanced security and reduced system throughput and/or higher power consumption. Guard rounds often represent 25% to 50% of the total processing time window. A typical system implementation will make this value a tuneable parameter. The parameter may be set a synthesis time, or may be a run-time configuration parameter.

Figure 4:
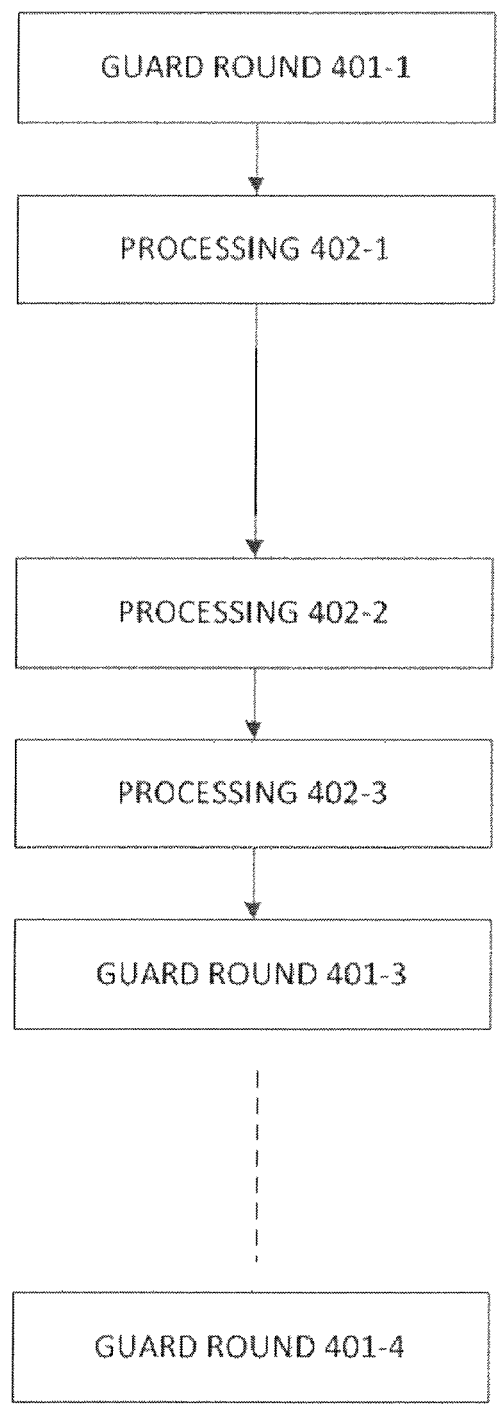
FIG. 4 shows a simplified diagram of AES encryption wherein a sequence of guard rounds is implemented to start an encryption process.

Referring to FIG. 4, shown is a simplified diagram of AES encryption. A sequence of $G_{pre}$ guard rounds is implemented to start an encryption process. Also, $G_{post}$ guard rounds can be inserted after the final round. Such guard rounds obfuscate the initial round to prevent many side-channel attacks identifying specific round types in order to determine a base line for the attack. Here, however, a number of guard rounds (for example 401-1 to 401-4) are inserted within the processing (402-1 to 402-3) such that extracting a recognisable special round does not lead to an indication of an ordering of the process. In its most extreme version, if a different large number of guard rounds were inserted between every two rounds, the result would be that a side-channel attack would gain little information about which rounds relate to the specific stream, but timing for the overall process would not be discernible from the extracted initial or final round data. Alternatively, guard rounds—both initial and final—are inserted randomly or deterministically within the process such that determination of a process schedule is not likely from extraction of initial or final round data.

Of course, the method of FIG. 4 is applied to discernible rounds but is equally applicable to other rounds within the cipher process.

Figure 5:
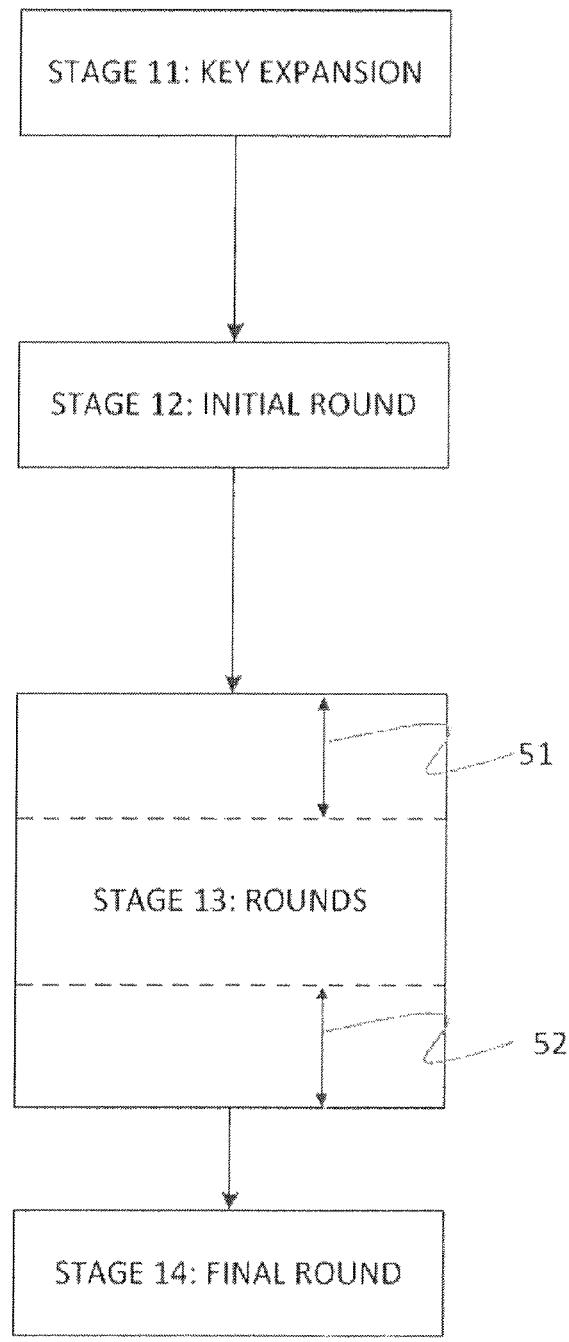
FIG. 5 shows another method for obfuscating an AES encryption process from side-channel attacks wherein dummy rounds are inserted within a sequence of cipher processor rounds.

Referring to FIG. 5, shown is another method for obfuscating an AES encryption process from side-channel attacks. Here, dummy rounds are inserted within the process in order to make determination of timing information more difficult. Dummy rounds are of any type, key expansion, initial, round, final round, etc. and are either selected at random or deterministically selected to reduce a likelihood of limiting side-channel attacks. For example, within the rounds inserting a number of rounds that are dummy rounds at unknown times within the rounds renders extraction of the rounds as a series of events more difficult thus making key determination more problematic.

For example, rounds 51 are added to the third stage (Stage 13) to replace the first round of the third stage with $G_{pre}$ new first rounds such that the beginning of the third stage is difficult to ascertain. Similarly, a number of rounds 52 are added after the third stage to make discerning the end of the third stage difficult. Thus, the third stage occurs within a given frame of rounds, but it is uncertain where it starts and where it ends. Further, rounds could be interspersed within the third stage to obfuscate the third stage further.

Similar stuffing of rounds is possible for Stage 11 and Stage 12, or alternatively, Stage 11 and Stage 12 are implemented numerous times so that it is uncertain which stage relates to which rounds and so forth.

In another embodiment for obfuscating encryption processes from side-channel attacks, a plurality of streams of data are encrypted in an interleaved fashion. By selecting operations from each process and interleaving them in a manner unknown outside the processor, a side-channel attacker would note two guard rounds and would not easily attribute one guard round to its associated stream. Further, addition of guard rounds of one or more types within the interleaved stream renders the process even more indiscernible.

It is noteworthy, that when guard rounds are used, their removal is essential to forming the cipher stream output data. As such, either the guard rounds are determinable based on a priori data such as the cipher key and a seed value, for example a value provided from outside the cipher processor, or the cipher processor maintains a schedule of guard rounds and provides this schedule to the de-multiplexer to separate cipher data from cipher guard round data. Advantageously, guard rounds do not need to have the same distribution as another stream and are therefore a different tool in obfuscating the cipher process from multiplexed stream data.

All of the techniques described here are directly and equally applicable to cryptographic hash and symmetric authentication schemes, including both cipher-based hash methods and methods based on SHA-1, SHA-2 and SHA-3 families of digest functions, including their use in HMAC authentication algorithms.

In an embodiment obfuscating the initial and final rounds from the other rounds is performed with same processing therein, such that they appear as any other round within the process. When this is the case, guard rounds act to obfuscate when the initial round and final rounds occur relative to the overall processing.

Numerous other embodiments may be envisaged without departing from the scope of the invention.

The invention claimed is:

1. A method comprising:
providing first data of a first data stream and a first secret key to a cipher processor for ciphering;
said cipher processor ciphering the first data in accordance with a first cipher process and the first secret key to provide output data; and
before ciphering of the first data, inserting extra data of at least a second data stream within the cipher processor in order to provide processing of at least two interleaved data streams, wherein each such data stream is processed using the same one, and only that same one, instance of a round and key expansion function for ciphering in accordance with at least a portion of said first cipher process, said extra data inserted within a sequence of cipher processor operations for obfuscating said output data.

2. A method according to claim 1 wherein the at least a portion of said first cipher process comprises inserting a plurality of guard rounds at one or more locations within the sequence of cipher processor operations to obfuscate an operation of the cipher processor from side-channel attack.

3. A method according to claim 1 wherein the at least a portion of said first cipher process comprises inserting a plurality of guard rounds immediately before an initial round and immediately after a final round, the initial and final rounds processed in a similar fashion to other rounds.

4. A method according to claim 2 wherein the at least a portion of said first cipher process comprises inserting a plurality of guard rounds similar to an initial round and a plurality of guard rounds similar to a final round to make it difficult to determine by way of side-channel attack when the initial and final rounds occurred.

5. A method according to claim 1 wherein the at least a portion of said first cipher process is inserted within the sequence of cipher processor operations differently for different first data to make it difficult to determine the position of the at least a portion of the said first cipher process within the sequence of cipher processor operations by way of side-channel attack.

6. A method according to claim 1 wherein the at least a portion of said first cipher process comprises dummy operations being executed solely to obfuscate operation of the cipher process.

7. A method according to claim 1 comprising:
providing a second secret key; and
providing second data to the cipher processor, the second data provided for being ciphered by the cipher processor,
wherein the at least a portion of said first cipher process comprises operations for performing the cipher with the second data and with the second secret key.

8. A method according to claim 7 wherein cipher processor operations on the first data and cipher processor operations on the second data are interleaved one with another in a known fashion within the cipher processor and in an unknown fashion from outside the cipher processor.

9. A method according to claim 7 wherein cipher processor operations on the first data and cipher processor operations on the second data are interleaved one with another in predetermined fashion within the cipher processor and in an unknown fashion from outside the cipher processor, the interleaving inconsistent.

10. A method according to claim 1 wherein cipher processor operations on the first data of the first data stream and cipher processor operations on second data of the second data stream are interleaved one with another in a known fashion within the cipher processor and in an unknown fashion from outside the cipher processor, the interleaving inconsistent between different first and second data streams.

* * * * *